United States Patent [19]

Konishi et al.

[11] Patent Number: 4,785,862
[45] Date of Patent: Nov. 22, 1988

[54] DUAL TIRE MOUNTING METHOD

[75] Inventors: Satoshi Konishi; Hiroshi Yamaguchi, both of Tokorozawa; Toshiyuki Watanabe, Kodaira; Shigehito Kishinami, Higashiyamato, all of Japan

[73] Assignee: Bridgstone Corporation, Japan

[21] Appl. No.: 906,311

[22] Filed: Sep. 11, 1986

[30] Foreign Application Priority Data

Sep. 11, 1985 [JP] Japan ................................. 60-201282

[51] Int. Cl.⁴ ............................................. B60C 11/00
[52] U.S. Cl. ............................................. 152/209 R
[58] Field of Search ............................. 152/209 R D

[56] References Cited

U.S. PATENT DOCUMENTS 2,255,994 9/1941 Bush ............................... 152/209 R
2,808,867 10/1957 Buddenhagen et al. ........ 152/209 R Primary Examiner—Michael Ball
Attorney, Agent, or Firm—Wigman & Cohen

[57] ABSTRACT

A method of mounting dual tires on motor vehicles, in which the tires have lateral grooves in the circumferential direction includes positioning the tires so that the neighboring lateral grooves on the respective tire faces nearest each other have phase differences in the circumferential direction. The phase difference between the neighboring lateral grooves is preferably one half of a pitch and the pitch is preferably smaller than 16 cm, and more preferably smaller than 13 cm.

9 Claims, 3 Drawing Sheets

THE CENTER OF THE VEHICLE

THE CENTER OF THE VEHICLE

DUAL TIRE MOUNTING METHOD

BACKGROUND OF THE INVENTION

1. Field of the Invention

The present invention relates to a dual tire mounting method for mounting tires with lateral grooves to motor vehicles, in particular, on trucks, buses, trailers, and the like.

2. Description of the Prior Art

In recent years, accompanying rapid advances in motorization, traffic noise has become a social problem which has placed reduction of tire noise as an important task. Along these lines, efforts have been made in the past in an attempt to reduce tire noise by changing in various ways the tread patterns, the internal structure of tires, and the materials that constitute tires. However, every one of these attempts to reduce noise resulted in a loss of durability of the tires due to a reduction in anti-wear, anti-separation, and anti-burst properties, and in maneuverability due to a reduction in the anti-slip property and driving stability of the tires. For instance, tires with a reduction of 10% in the crown radius and a reduction of 20% in elasticity of tread rubber, which can reduce coasting sound pressure level in actual cars of about 4 dB(A) at the speed of 80 km/h, resulted in sharply aggravated wear life, anti-cut performance, and so on. Therefore, compatibility between reduction in noise, and durability and maneuverability, has been very difficult to achieve.

On the other hand, safety being in the paramount requirement for motor vehicles, it is inevitable to use tires with sufficient durability and maneuverability performances. As a result, when tires such as dual tires are mounted, there has been problem that large noise is generated.

SUMMARY OF THE INVENTION

An object of the present invention is to resolve the above problems, and its principal object is to provide a dual tire mounting method which can reduce sharply the noise from tires without sacrificing the durability and maneuverability performances.

A further object of the present invention is to provide a dual tire setting method which can reduce markedly the peak value of the noise from the tires.

A still further object of the present invention is to provide a dual tire mounting method which can cancel out the noise from the tires by the interference of noises.

Another object of the present invention is to provide a dual tire mounting method which can convert the noise from the tires into white noise.

Still another object of the present invention is to provide a dual tire mounting method which can reduce noise from tires that have tread patterns of variable pitches.

In order to achieve the above objects, the dual tire mounting method according to the present invention positions the dual tires so that the tread pattern formed on the facing sides of each of the dual tires have, in the circumferential direction, phase differences between them.

These and other objects, features and advantages of the present invention will be more apparent from the following description of a preferred embodiment taken in conjunction with the accompanying drawings.

DESCRIPTION OF THE PREFERRED EMBODIMENT

Figure 1:
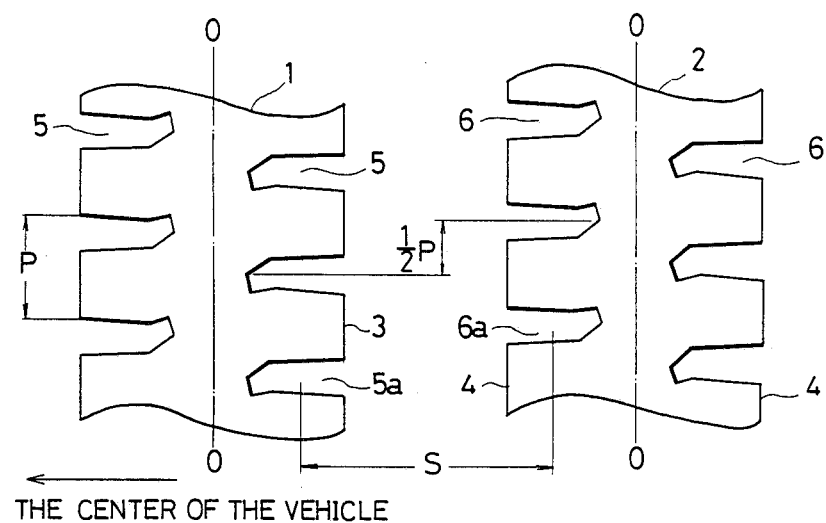
FIG. 1 is an expanded view of dual tires that are positioned in accordance with an embodiment of the present invention.

Referring to the figures, an embodiment of the present invention will be described in the following specification. Referring to FIG. 1, there are mounted dual tires including tire 1 which is placed on the inner side of the vehicle, and tire 2 which is placed on the outer side of the vehicle, on the rear of a vehicle such as a truck, bus, or trailer. In FIG. 1, the direction of the center of the vehicle is indicated by arrow.

These tires 1 and 2 are lug type tires on which are formed numerous lateral grooves on both shoulders 3 and 4. As used herein, what is meant by a lateral groove is a groove which lies in a direction that crosses the equatorial plane (0—0) of the tire, preferably in the direction that crosses the equatorial plane (0—0) of the tire at substantially 90°. Moreover, these lateral grooves 5 and 6 are nearly parallel to the meridians of the tires 1 and 2, and are separated by pitch P in the circumferential direction. Moreover, when the tire 1 which is on the side nearer to the vehicle center and the tire 2 which is on the side away from the vehicle center, are mounted on the rear of a vehicle, the lateral grooves 5a and 6a that are on the sides of the tire that are close to each other are shifted by substantially one half of a pitch, namely, P/2, in the circumferential direction.

As a result, noises that are generated alternately by these lateral grooves in driving, cancel each other by interference to approach white noise, as well as reducing the peak value of the noise, so that the tire noises can be decreased. Moreover, in the so-called variably pitched tires, in which the pitches of the lateral grooves 5 and 6 vary in the circumferential direction of the tire, it is only necessary to shift those lateral grooves by substantially one half of the average pitch.

As a result of various kinds of tests, the inventors of the present invention discovered that the noise reduction effects mentioned in the foregoing are especially conspicuous when the wavelength W of the noise that is generated by the lateral grooves 5 and 6 and the distance s between the lateral grooves satisfies the condition:

$$W \leq 8 \times s. \qquad (1)$$

In the above, the distance s between the lateral grooves is the distance between the centers in the longitudinal direction of the lateral grooves 5a and 6a that are on the sides of the tire nearest one another. Eq. (1) may be transformed into Eq. (2) if one calls the pitch of lateral grooves 5 and 6, P m; the circumferential speed of tires 1 and 2, V m/sec, and the velocity of sound, C m/sec:

$$V \leq P \times C/(8 \times s). \tag{2}$$

If one substitutes into Eq. (2) the value of 340 m/sec for velocity of sound C, 27.8 m/sec (i.e. 100 km/h) which is the maximum practical value for the circumferential speed V of the tire, and 25 cm which is the maximum distance s between the lateral grooves for ordinary tires, then the pitch P for the lateral grooves 5 and 6 becomes less than 16 cm. From this result, it is found that pitch P in the circumferential direction of the lateral grooves 5 and 6 for the tires 1 and 2 is preferred to be less than 16 cm, and more preferably the pitch should be less than 13 cm, for which advantageous effects will be obtained for the practical speed of 22.2 m/sec (i.e. 80 km/h). Further, when the length of lateral grooves 5 and 6 along a tread width is more than 15% of the tread width, the noise reduction effects are especially large.

Figure 2:
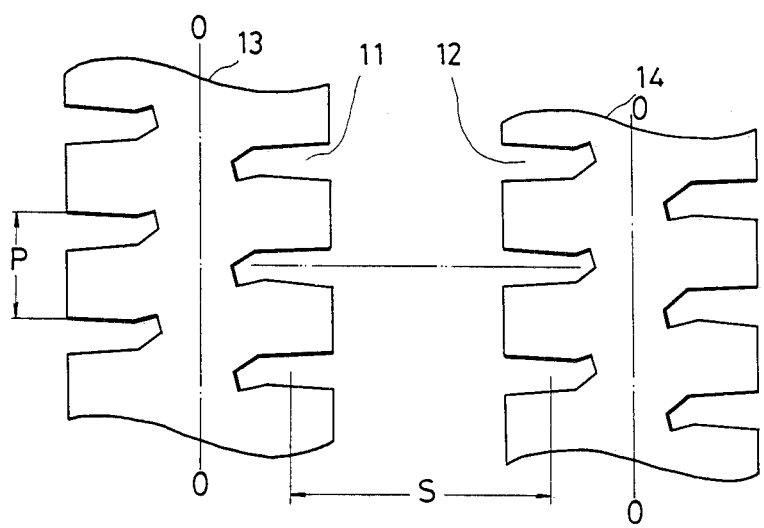
FIG. 2 is an expanded view of dual tires that are positioned in accordance with a comparative example.
Figure 3:
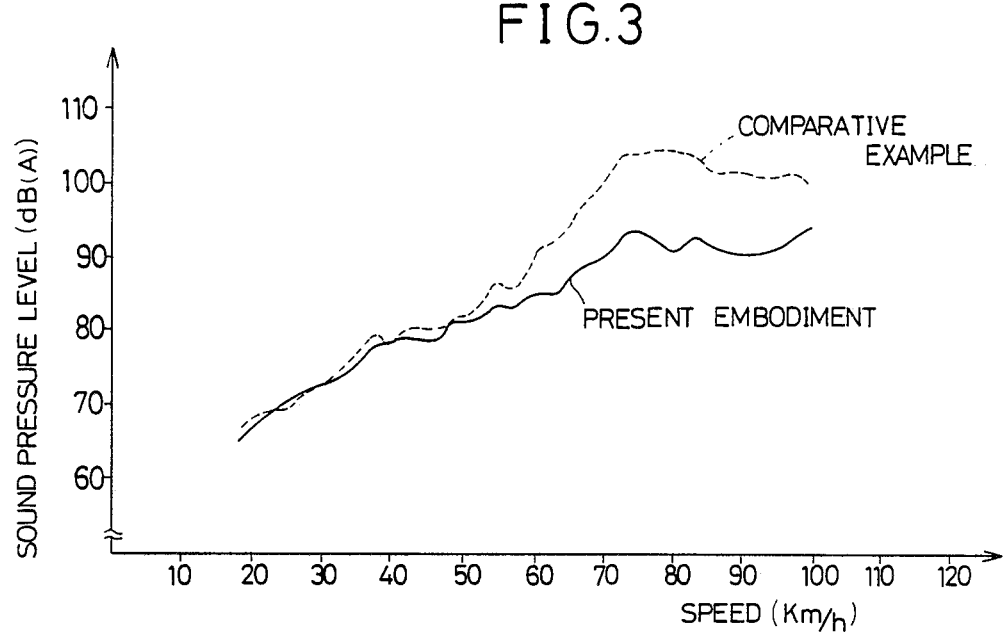
FIG. 3 is a graph that shows the results of noise measurement in a test room for the embodiment and the comparative example.

FIG. 3 shows the experimental results for the embodiment of the present invention in which tires are set with the neighboring lateral grooves 5a and 6a shifted by one half of a pitch in the circumferential direction, as shown in FIG. 1, and for the comparative example in which the lateral grooves 11 and 12 are set coincident in the circumferential direction, as shown in FIG. 2. In the test, two lug type tires with size of 10.00-20 14PR and pitch P of 7 cm were set on drums, and noise measurement was taken at the position which is 1 m away from the center of two tires in the axial direction of the tire, and had a height of 25 cm from tire contact surface on the drum. The tires 1 and 2 for the present embodiment and the tires 13 and 14 for the comparative example had identical tread patterns, structures, and materials. As may be clear from FIG. 3, in the region of speed which is greater than 50 km/h, the sound pressure level of the embodiment is lower than the sound pressure level of the comparative example, and in particular, in the neighborhood of 80 km/h the sound pressure level is decreased even by 10 to 15 dB(A), showing conspicuous noise reduction effects.

Figure 4:
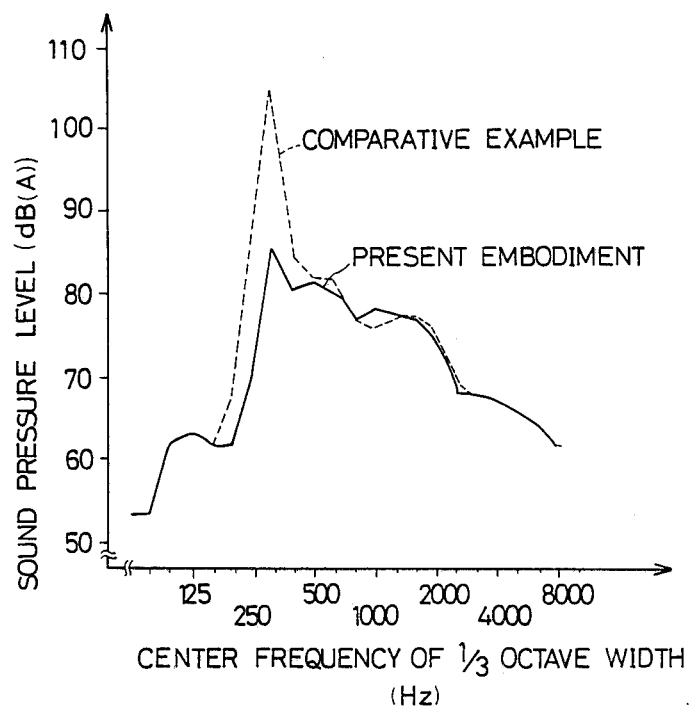
FIG. 4 is a graph that shows the analysis results for the center frequency of $\frac{1}{3}$ octave width.

FIG. 4 shows the results of analysis for the center frequency of one third octave width, for the speed of 80 km/h and under identical conditions as for the test shown in FIG. 3. In FIG. 4, it is clear that the pattern pitch component (sound which is generated periodically from the lateral groove) for the embodiment is reduced considerably from that of the comparative example.

Figure 5:
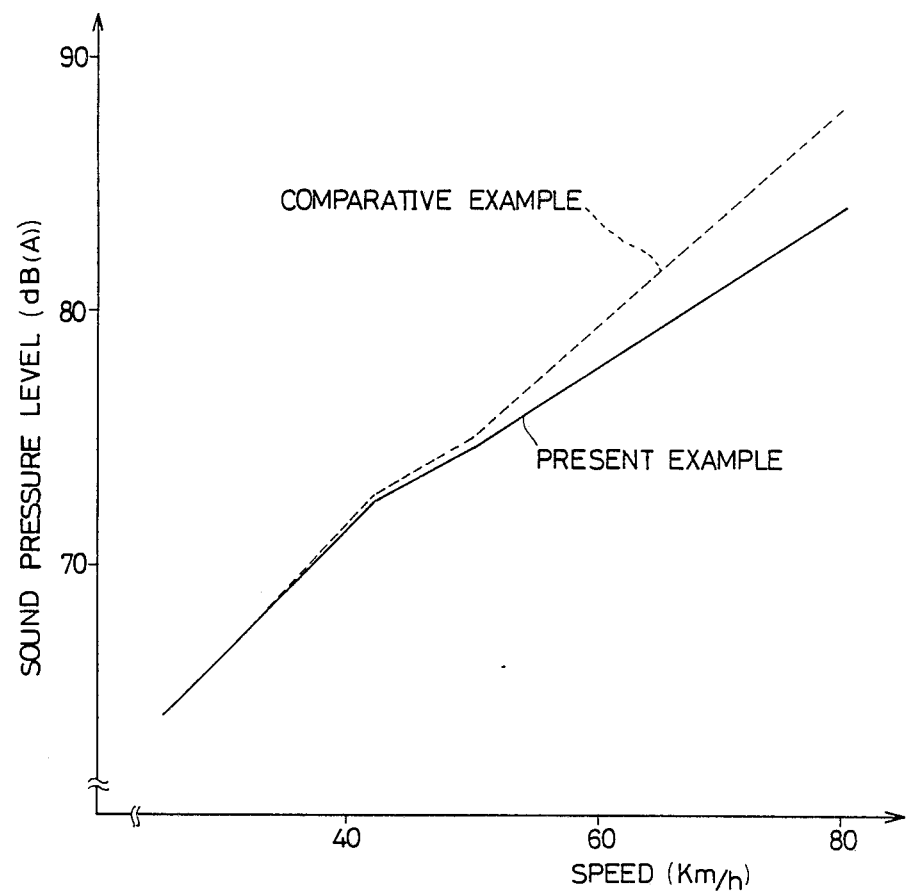
FIG. 5 is a graph that shows the results of noise measurement for the case of mounting the dual tires of the embodiment on a vehicle.

FIG. 5 shows the results of measurement on the noise taken at a position which is 7.5 m laterally from the vehicle center and has a height of 1.2 m from the ground, for the case of coasting running where the tires of the present embodiment and the comparative example are set on a flat body truck of the so-called 2.D-4 type (a type which has one shaft for the front wheels and two shafts for the rear wheels, and one of the rear wheel shafts is the driving shaft and four tires are set on each of the rear wheel shafts). As may be seen from FIG. 5, in the region of speed greater than 50 km/h, the noise of the embodiment is sharply reduced. The tires used for this test are identical to the tires that were used for the test of FIG. 3.

It should be noted that although lug type tires with lateral grooves 5 and 6 are used in the foregoing embodiment, use may be made in the present invention of ribbed lug type tires that have longitudinal grooves which are nearly parallel to the equatorial plane, in addition to the lateral grooves, or block type tires. Moreover, the lateral grooves need only be formed on the neighboring two shoulder sections of the two tires of the dual tires, and do not have to be formed on the distant shoulder sections.

As described in the foregoing, according to the present invention, it becomes possible to reduce sharply the tire noise when dual tires are mounted, without reducing the durability and maneuverability performances of the tires.

Although the invention has been described in its preferred embodiments, it is to be understood that various changes and modifications may be made within the purview of the appended claims without departing from the true scope and spirit of the invention in its broader aspects.

What is claimed is:

1. A method of mounting dual tires on a motor vehicle in which said tires have lateral grooves in the circumferential direction of said tires and in which said tires of the dual tires have the same tread pattern, said mounting method characterized in that said tires are mutually separated by a predetermined distance along a direction of a wheel shaft on which said tires are mounted, and the neighboring lateral grooves on the respective tires that lie on the inside and the outside of the faces of the dual tires nearest one another, are positioned in the circumferential direction so that said neighboring lateral grooves are shifted with respect to one another by substantially one half of a pitch of the grooves in the circumferential direction.

2. The method of mounting dual tires as claimed in claim 1, wherein said lateral grooves have the same spaces therebetween in the circumferential direction.

3. The method of mounting dual tires as claimed in claim 1, wherein, each of said tires have variably pitched tread patterns, and the lateral grooves on the respective tires are shifted with respect to one another by substantially one half of the average pitch.

4. The method of mounting dual tires as claimed in claim 2, wherein the pitch P in the circumferential direction of said lateral grooves satisfies the condition $$P \geq 8 \times S \times V/C;$$

where S is the distance between the neighboring lateral grooves on each of said tires, V is 100 Km/h and C is the velocity of sound.

5. The method of mounting dual tires as claimed in claim 4 wherein the circumferential pitch of said lateral grooves is preferred to be smaller than 16 cm, and more preferably to be smaller than 13 cm.

6. The method of mounting dual tires as claimed in claim 3 wherein the length of said lateral grooves along a tread width is greater than 15% of the tread width.

7. A method of mounting dual tires on a motor vehicle in which said tires have lateral grooves in the circumferential direction of said tires, said mounting method characterized in that said tires are mutually separated by a predetermined distance along a direction of a wheel shaft on which said dual tires are mounted, and the neighboring lateral grooves on respective tires that lie on the inside and the outside of the faces of the dual tires nearest one another, are positioned in circumferential direction so that said neighboring lateral grooves are shifted with respect to each other by substantially one half of a pitch of the grooves in the circumferential direction in order for sound waves generated by the neighboring lateral grooves to have a significant magnitude of phase difference therebetween, wherein said sound waves have the same frequency.

8. The method of mounting dual tires as claimed in claim 7, wherein said tires are mutually separated by such a distance along a direction of a wheel shaft on which said dual tires are mounted that a distance between the neighboring lateral grooves on each tires satisfies a condition $$S > W/8$$

in which W is a wavelength of the sound waves generated by the neighboring lateral grooves, and the neighboring lateral grooves are positioned in circumferential direction so that said neighboring lateral grooves are shifted with respect to one another by substantially one half of a pitch of the grooves.

9. A method of mounting dual tires on a motor vehicle in which said tires have lateral grooves in the circumferential direction of said tires, said mounting method characterized in that said tires are mutually separated by such a distance along a direction of a wheel shaft on which said dual tires are mounted such that a distance between the neighboring lateral grooves on each tire satisfies a condition $$S > (PC/8V)$$

wherein P is a pitch in circumferential direction of the lateral grooves, C is the velocity of sound and V is 100 Km/h, and the neighboring lateral grooves on the respective tires that lie on the inside and outside of the faces of the dual tires nearest one another are positioned in the circumferential direction so that said neighboring lateral grooves are shifted with respect to one another by substantially one half of a pitch of the grooves in the circumferential direction.

* * * * *